United States Patent
Mukherjee et al.

(10) Patent No.: US 6,697,557 B2
(45) Date of Patent: Feb. 24, 2004

(54) TWO-DIMENSIONAL OPTICAL FILTER AND ASSOCIATED METHODS

(75) Inventors: Pritish Mukherjee, Tampa, FL (US); Sarath Witanachchi, Tampa, FL (US)

(73) Assignee: University of South Florida, Tampa, FL (US)

(*) Notice: Subject to any disclaimer, the term of this patent is extended or adjusted under 35 U.S.C. 154(b) by 79 days.

(21) Appl. No.: 09/971,111

(22) Filed: Oct. 4, 2001

(65) Prior Publication Data

US 2002/0067901 A1 Jun. 6, 2002

Related U.S. Application Data

(60) Provisional application No. 60/237,813, filed on Oct. 4, 2000.

(51) Int. Cl.[7] ............................................... G02B 6/06
(52) U.S. Cl. ....................................................... 385/116
(58) Field of Search ............................. 385/31, 32, 50, 385/115, 116

(56) References Cited

U.S. PATENT DOCUMENTS 5,225,876 A * 7/1993 Lux et al. .................... 396/109

OTHER PUBLICATIONS

Mukherjee, et al., "Novel Continuously Tunable High Spectral Rsolution Optical Filter for Two–Dimensional Imaging," Review of Scientific Instruments, vol. 72, No. 6, Jun. 2001.

\* cited by examiner

*Primary Examiner*—Euncha Cherry
(74) *Attorney, Agent, or Firm*—Smith & Hopen, P.A.; Molly L. Sauter

(57) ABSTRACT

An optical filter includes an input optical fiber bundle and an output fiber bundle. Each of the bundles has one end having the fiber ends substantially two-dimensionally arrayed and another end substantially linearly arrayed. Each input fiber is configured to receive a portion of a two-dimensional input image at the two-dimensional end and transmit the image portion to the one-dimensional end. A spectrally dispersive element receives the image portions from the input fiber bundle and outputs a predetermined spectral component to the output optical fiber bundle at the one-dimensional end, transmitting the image portion to the two-dimensional end. The output fiber bundle two-dimensional ends are arrayed in corresponding fashion to the first ends of the input fibers for spatially reconstructing the input image.

51 Claims, 12 Drawing Sheets

TWO-DIMENSIONAL OPTICAL FILTER AND ASSOCIATED METHODS

CROSS-REFERENCE TO RELATED APPLICATION

This application claims priority to provisional application No. 60/237,813, filed Oct. 4, 2000, entitled "Two-Dimensional Optical Filter with High Spectral, Temporal, and Spatial Resolution."

BACKGROUND OF THE INVENTION

1. Field of the Invention

The present invention relates to two-dimensional optical filters and methods, and, more particularly, to such devices and methods having high spectral resolution and being adapted for continuous tuning.

2. Description of Related Art

The spectral filtering of multicolor images has been studied [1], resulting in filters employing absorption [2–7], dispersion [7–11], selective reflection [12–15], and spectrally selective transmission [1, 16–22]. A variety of techniques are known for spectral image filtering [23], including dichroic coated filters [24–27], holographic filters [28–35], acousto-optic tunable filters [35], Fabry-Perot tunable filters [24, 35–39], tunable birefringent filters [23, 40–46], and Lyot filters [23, 43–47]. The filtration mechanisms vary from the use of Bragg diffraction caused by periodically modulated refractive indices in holographic and acousto-optic tunable filters to the use of selectivity in transmission by polarization in Lyot filters. The basic underlying objective is the selective transmission, absorption, or reflection of a selected optical range. These techniques and their development for enhancing tunability and spectral sensitivity have been ongoing for some time [50–52].

High-sensitivity charge-coupled-device (CCD) cameras can be combined with notch filters for high-spectral-resolution two-dimensional imaging or with bandpass filters for broadband imaging. However, the dual requirements of fidelity of two-dimensional spatial imaging and high-resolution, continuous spectral tunability are not known to be available in currently existing systems.

SUMMARY OF THE INVENTION

It is therefore an object of the present invention to provide an optical filter adapted to separate a multifrequency, two-dimensional image into spectral components.

It is an additional object to provide such a filter that retains the integrity of the two-dimensional image.

It is a further object to provide a method for making such a filter.

It is another object to provide a method for using such a filter.

These objects and others are attained by the present invention, an optical filter system for separating an image into spectral components. The filter comprises a plurality of input optical fibers, each having a first end and a second end. The first ends are two-dimensionally arrayed and are thus substantially coplanar; the second ends are substantially linearly arrayed and are thus also substantially coplanar. Each input fiber is configured to receive a portion of a two-dimensional input image at the first end and transmit the image portion to the second end.

A spectrally dispersive element following the input fiber array is configured to receive the image portions from the input fiber second ends and to output separated spectral components thereof.

A plurality of output optical fibers each has a first end and a second end. The first ends are substantially linearly arrayed and thus are substantially coplanar; the second ends are two-dimensionally arrayed and are also thus substantially coplanar. Each output fiber is configured to receive a portion of the output of the spectrally dispersive element at the first end and transmit the image portion to the second end. Further, the second ends are arrayed in corresponding fashion to the first ends of the input fibers for spatially reconstructing the input image.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of one embodiment of the present invention will now be presented with reference to FIGS. 1–13B. The optical filter uses optical fiber bundles to maintain image integrity while accurately redirecting the spectral components after separation by a diffraction grating. With a suitably arranged fiber array, the image can be angularly and spatially separated without overlap in order to output a two-dimensional image at a desired wavelength.

The System

Figure 1:
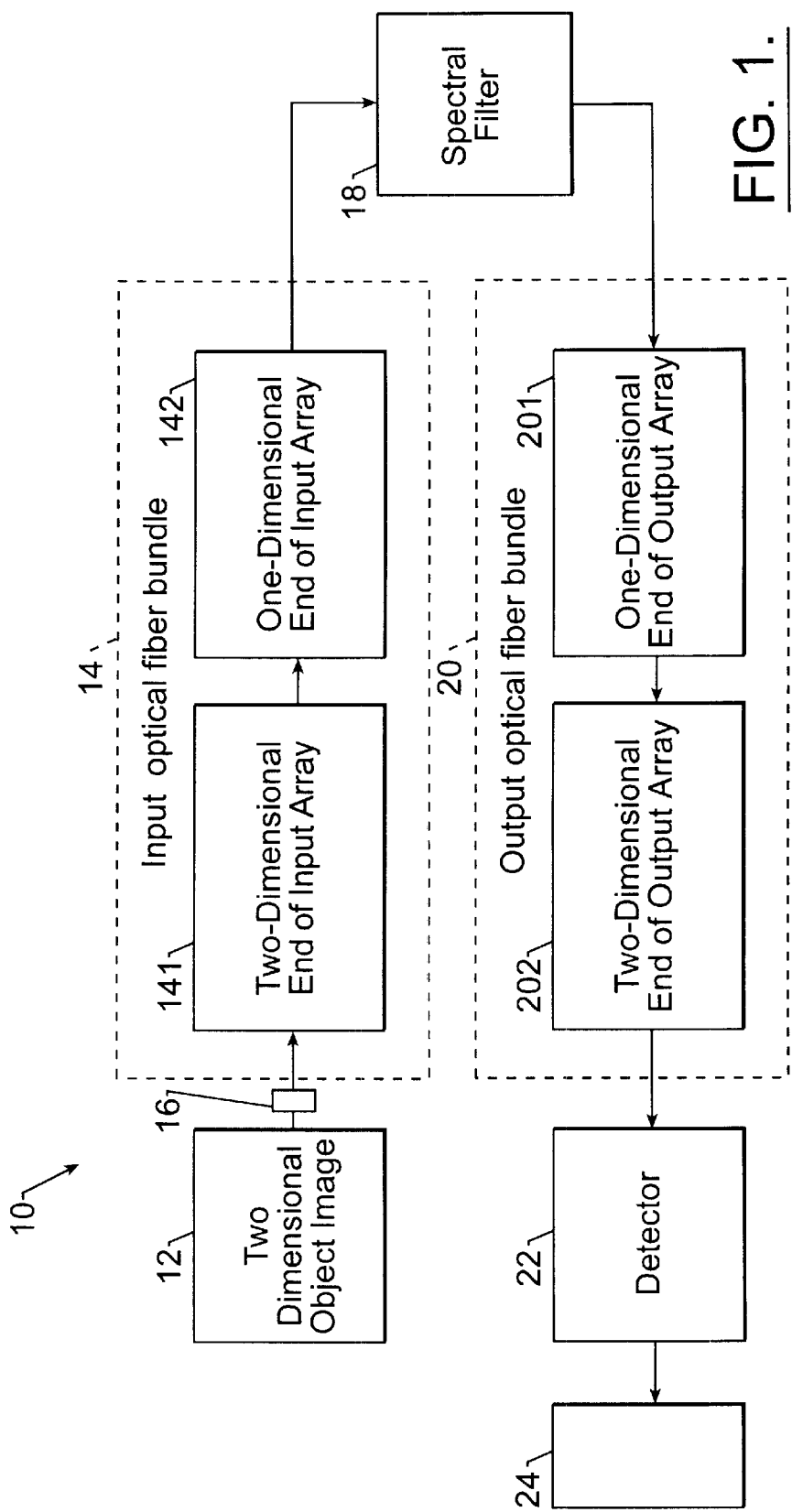
FIG. 1 is a block diagram of the optical filter of the present invention.
Figure 2:
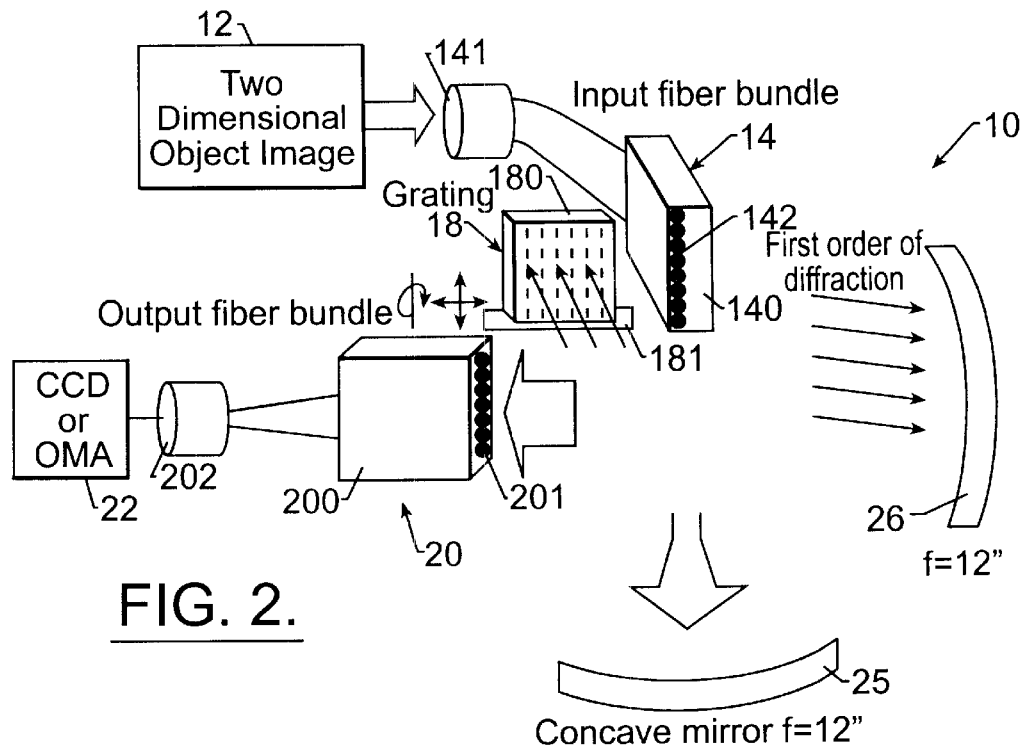
FIG. 2 is a schematic diagram of the filter system.

A block diagram of the system 10 of the present invention is given in FIG. 1, with a schematic in FIG. 2. A two-dimensional input image 12 impinges on an input optical fiber array 14. Prior to entering the array 14 there may be placed, if desired, an optical element 16 to achieve magnification (for higher-spatial-resolution imaging) or reduction (for greater field-of-view imaging).

The input array, or input fiber bundle, 14 comprises a plurality of optical fibers 140, each having a first end 141 and a second end 142. The arrangement of the fibers 140 depends upon the desired application, with a close-packed orientation being preferred for highest resolution and a more scattered, or loose-packed, orientation preferred for site-specific multipoint imaging. Thus the invention is not intended to be limited to a particular packing embodiment.

Preferably the fibers' first ends 141 should be substantially coplanar for receiving the input image. The input array 14 digitizes the input image, with the spatial resolution thereof depending upon the resolution of the digitization process, which is determined by such characteristics as fiber diameter and packing density. As an example, 10-$\mu$m single-mode fibers with interfiber spacings <20 $\mu$m provides high spatial resolution. Further, if the image is magnified prior to entering the input array 14, a spatial resolution of <1 $\mu$m is achievable.

Figure 3:
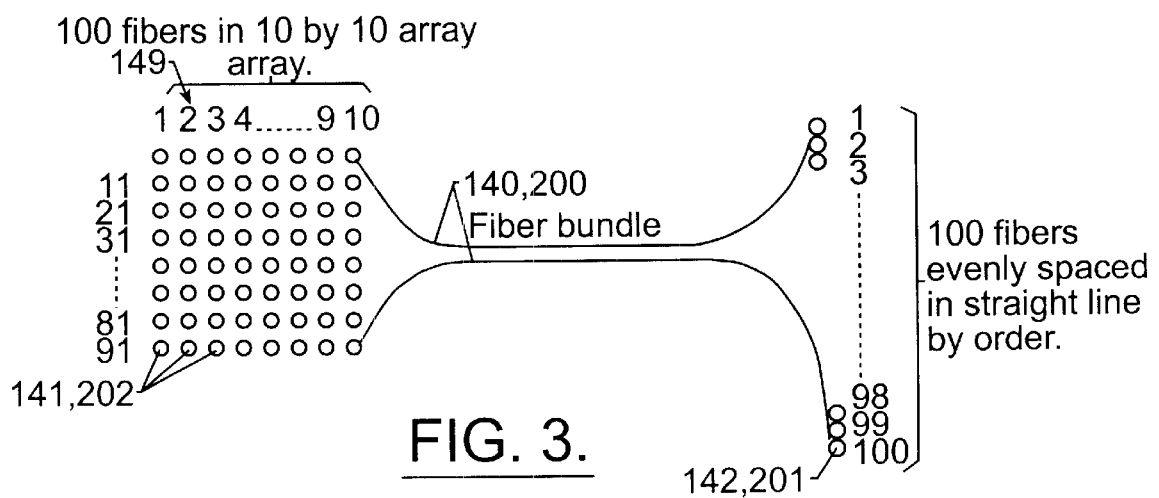
FIG. 3 illustrates the pathways of the fibers in the input and output arrays.
Figure 4:
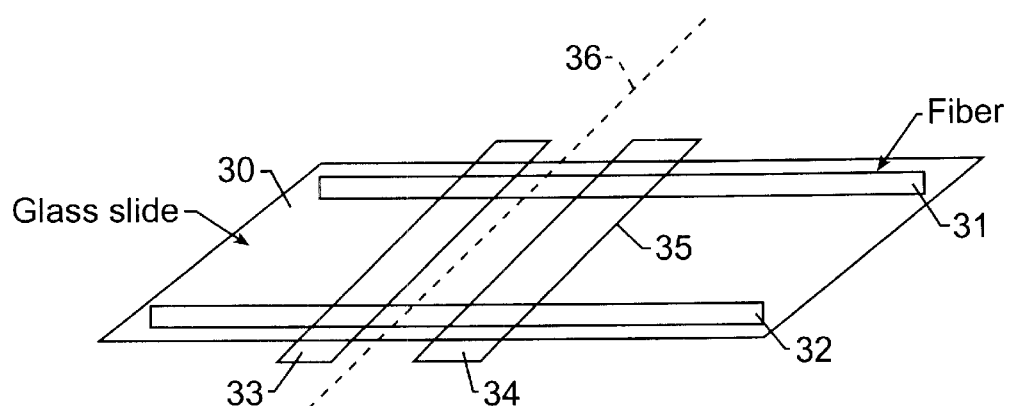
FIG. 4 is a perspective view of a device for aligning the one-dimensional fiber array.

The second ends 142 of the input array 14 are oriented into a linear array to provide a linear image for subsequent spectral filtering (see FIG. 3). In a preferred embodiment of the invention, adjacent fibers 140 in the linear array are connected at the two-dimensional first ends 141 to spatially contiguous regions. This sequencing of fibers 140 reduces errors in spatial fidelity in the output spectral image.

The optical image of the input array 14 at the one-dimensional second end 142 next becomes the object for a spectrally dispersive element 18, such as, but not intended to be limited to, a monochromator, for dispersing the constituent spectral components. A monochromator may be used as a dispersing element when the slit width is wider than the fiber diameter and as a spectral filter when the slit width is narrower than the fiber diameter. Preferably the one-dimensional input image is imaged at a 1:1 ratio at the output of the filter 18. The narrow width of the second end 142 of the input array 14, which constitutes, in effect, the width of the input slit of the filter 18, coupled with the achievable spectral dispersion of a typical triple-grating monochromator, permits angstrom-level resolution of the output spectral image.

An output optical fiber array 20 is configured substantially identically to the input array 14. Now the one-dimensional fiber array comprises the first ends 201 of the component fibers 200 and constitutes the output slit of the filter 18. By adjusting the grating 180 of the filter 18, a desired spectral component of the linear image can be obtained on the output array 20. The tunable spectral dispersion analyzes the input light into its spectral components and permits a selection of a desired individual frequency component of the initial multicolor image while maintaining the spatial integrity of the linear input image.

Imaging the output of the spectrally dispersive element 18 onto a substantially identical one-dimensional fiber array 20 provides a one-to-one correlation between the spatial information contained in the two linear arrays 14, 20. Light from each fiber 140 in the input array 14 to the filter 18 is filtered, with the results of the filtration obtained in the corresponding spatial counterpart fiber 200 of the output array 20.

Since light at the spatial location of each fiber 200 of the output array 20 can be traced back to a corresponding origin 140 in the input array 14 prior to filtering, the second ends 202 of the fibers 200 of the output array 20 can be reconstituted into the same configuration as the original two-dimensional array to obtain a spectrally filtered, two-dimensional image of the original object at a desired wavelength.

The final image can be detected using, for example, a CCD camera 22, and then displayed, for example, in real time on a video monitor 24. Exemplary modes of detection include:

1. If the original object is a dynamically evolving entity, such as fluorescence from an expanding laser-ablated plume, a fast, time-gated camera, such as an intensified charge-coupled device (ICCD) camera, can be used to capture transient two-dimensional spectral images. At present, commercially available gate widths for such cameras permit attainable temporal resolutions for such dynamic images in the 10-ns range.
2. Another mode of detection comprises time-integrated detection of images for which dynamic characteristics are not required. Fast gating is not required for this mode, which is suitable, for example, for objects having extremely low light intensities.

The exemplary system schematic of FIG. 2 illustrates a two-dimensional object image 12 incident on the input array 14 and thereby digitized into a plurality of pixels. The light emerging from the second ends 142 is collected by a first concave mirror 25 and sent to a grating 180 as a collimated parallel beam. The first-order diffraction from the grating 180 is incident on a second concave mirror 26. The image of the input one-dimensional array 14 is formed in the focal plane at a predetermined distance, here 12 in., away from the second mirror 26 and comprises a ribbon of color comprising a series of horizontal colored lines.

In each horizontal line, representing the image of a single pixel, the color varies from blue to red from one end to the other for an incident white light object image. Each color line in the ribbon is therefore the image of a corresponding fiber 140 in the one-dimensional end 141 of the input array 14. The one-dimensional end 201 of the output array 20 is vertically aligned on a desired spectral region of the band, for collecting light from the corresponding fibers 140 in the input array 14. The image is then restored to its two-dimensional form at the two-dimensional end 202 of the output array 20.

In the exemplary embodiment shown in FIG. 2, the filter 18 comprises a monochromator comprising a single square, plane reflection grating 1×1 in., having 1200 grooves/mm. The grating 180 of filter 18 is mounted on a stage 181 to achieve vertical positioning of the grooves and permit three degrees of freedom of movement, including horizontal and vertical adjustments and vertical rotation. The zeroth order of diffraction from the grating 180, while having the greatest intensity, is not usable, as there is no angular separation between the spectral components of the image. In this embodiment only the first-order diffraction was collected by the concave mirror 26.

Both mirrors 25, 26 comprise front-reflection concave mirrors having a 6-in. diameter and a 12-in. focal length. Mirrors are believed preferable over a lens-based system in their elimination of chromatic aberration. The first mirror 25 is positioned 12 in. away from the one-dimensional end of the input array 14; the second mirror 26, 12 in. away from the one-dimensional end of the output array 20. Thus the two mirrors 25, 26 form a telescope of unit magnification in effect. This arrangement ensures that the beams incident on the grating are parallel beams and allows accurate one-to-one imaging between the one-dimensional array ends. The spectrum from the grating 180 avoids interfiber spatial and spectral overlap, thereby ensuring the smallest bandwidth and lowest cross-talk for the system 10.

The image is then collected by the detector 22, which may comprise a gated CCD camera or optical multichannel analyzer (OMA) system as desired or appropriate.

The Fiber Arrays and Their Fabrication

In a preferred embodiment the input 14 and output 20 fiber arrays should be substantially identical. The two-dimensional ends comprise a 10×10 fiber array; the one-dimensional ends 142, 201, a 100×1 array (FIG. 3). In one embodiment, each fiber 140, 200 comprises silica and has a 200-μm core diameter and a 240-μm total diameter including the cladding. The arrays 14, 20 each have a length of 24 mm at the one-dimensional end, and each fiber 140, 200 has a length of 40 cm.

The transmission range of the fibers spans the visible and infrared region, 400–1200 nm. The fiber ends are polished to a surface roughness better than 1 μm.

The imaging arrangement necessitates that the one-dimensional structures are the same spatially, including the same microarrangement and spacing of each individual fiber end. Otherwise, a fiber in the output one-dimensional end 201 would not be able to collect the light from its corresponding counterpart in the input one-dimensional end 142 of the fiber array or not be able to collect light at a desired wavelength.

The two fiber arrays 14, 20 in this embodiment are formed in this exemplary embodiment using 100 fibers, each 80 cm in length. Using the device shown in FIG. 4, two fibers 31, 32 are glued in parallel fashion onto a glass slide 30. Two pieces of glass 33, 34 are glued atop the fibers 31, 32, creating a slot 35. The desired 100 fibers are then inserted into the slot 35 next to each other, and the fibers and glass slide 30 are glued together, for example, with an epoxy-type glue. After the glue is dry, the assembly is cut apart along the dotted line 36 with a diamond saw. Both cut ends of each bundle are finally mechanically polished.

The two-dimensional ends 141, 202 of the arrays 14, 20 are formed using specially designed fiber holders. Two plastic disks, having diameters of 24 mm and thicknesses of 0.25 in., each have 100 holes drilled therein in a 10×10 square array, each hole having a 508-μm diameter, with a center-to-center distance of 2 mm between consecutive holes.

A 1.375-in.-long hypodermic needle having an inner diameter of 250 μm is inserted and glued into each of the 200 holes to provide support for the fibers. The disks are fitted and glued inside glass tubes. The fibers are inserted into the needles by pushing on all the fiber ends with, for example, a flat microslide to ensure coplanarity of the ends. Then mounting wax is used to fix the fibers in position to form the two-dimensional arrays. It may be appreciated by one skilled in the art that additional methods may be contemplated, including different techniques and materials to achieve the same fiber arrays described herein.

System Characterization

Testing of the system 10 was performed using two kinds of light sources. A He—Ne laser had monochromaticity and directionality to permit ease of alignment and calibration.

Figure 5:
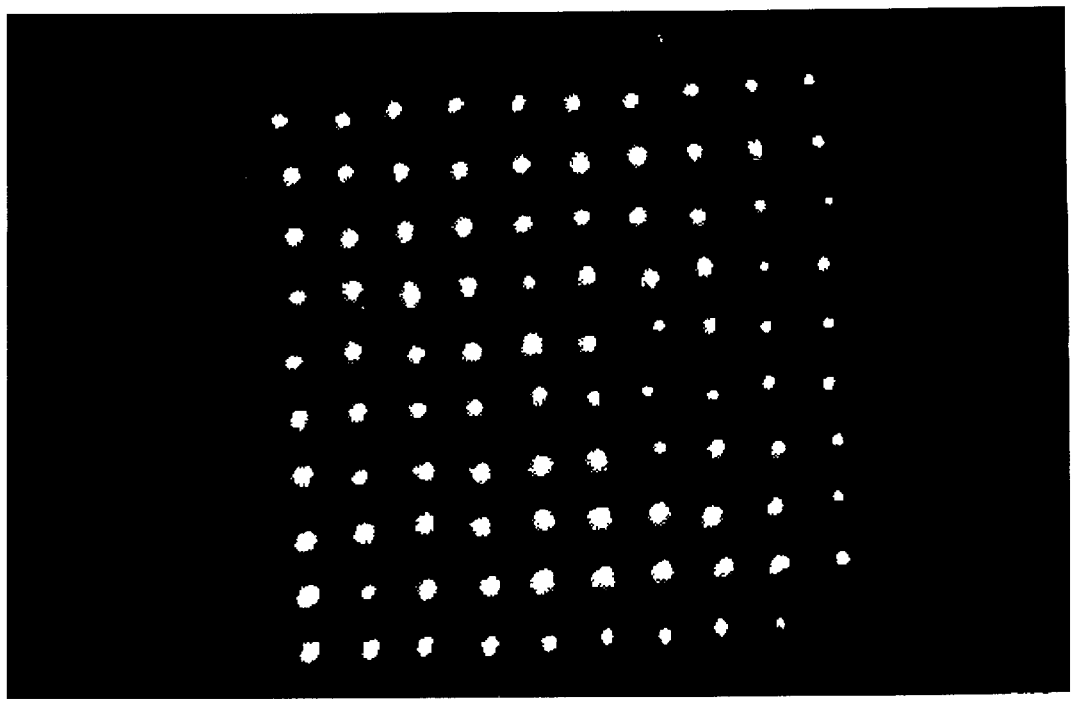
FIG. 5 is an output image for He—Ne laser illumination.
Figure 6:
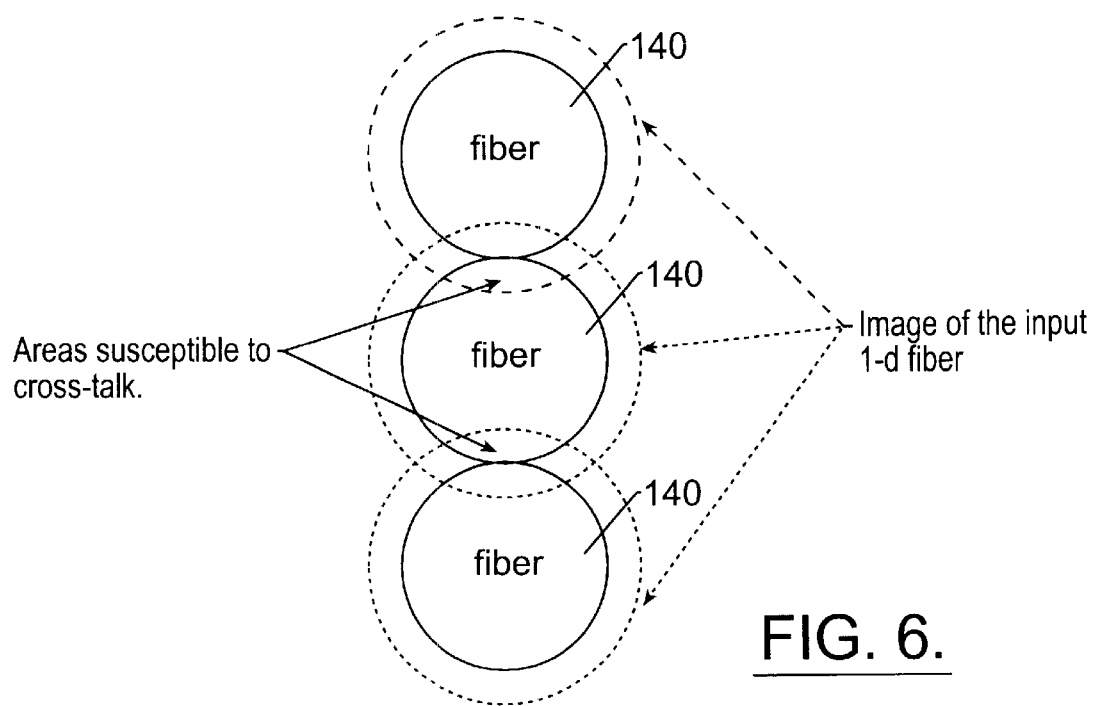
FIG. 6 illustrates potential areas of cross-talk in adjacent fibers.

In order to verify a one-to-one correspondence between the arrays 14, 20, the two-dimensional ends 141 of the input array 14 were illuminated by a lens-expanded beam of laser light at 632.28 nm, with the output image from the output array 20 monitored with a CCD camera (FIG. 5). The tilt of the illustrated image is because of a tilt of the camera. Variations in the spatial intensity profile are due to variations in laser beam intensity at the input end. It was found that misalignments at fiber numbers 57, 68, and 77 were caused by mispositioning of the fibers during fabrication, and that fiber number 100 (lower right-hand corner) was broken. However, all fibers were illuminated on tuning the grating to the proper laser wavelength. Even a slight detuning extinguished the illumination substantially completely.

The spatial integrity of the two-dimensional image after transmission through the filter is an important issue. For example, if the image at each input one-dimensional end is larger than the actual size of the output one-dimensional array end (FIG. 6), it is possible for the light from one input fiber 140 to "leak" into other adjacent fibers, which is referred to as spatial cross-talk. This could manifest itself in spatial as well as spectral diffusion and resultant distortion of the transmitted image.

Figure 7:
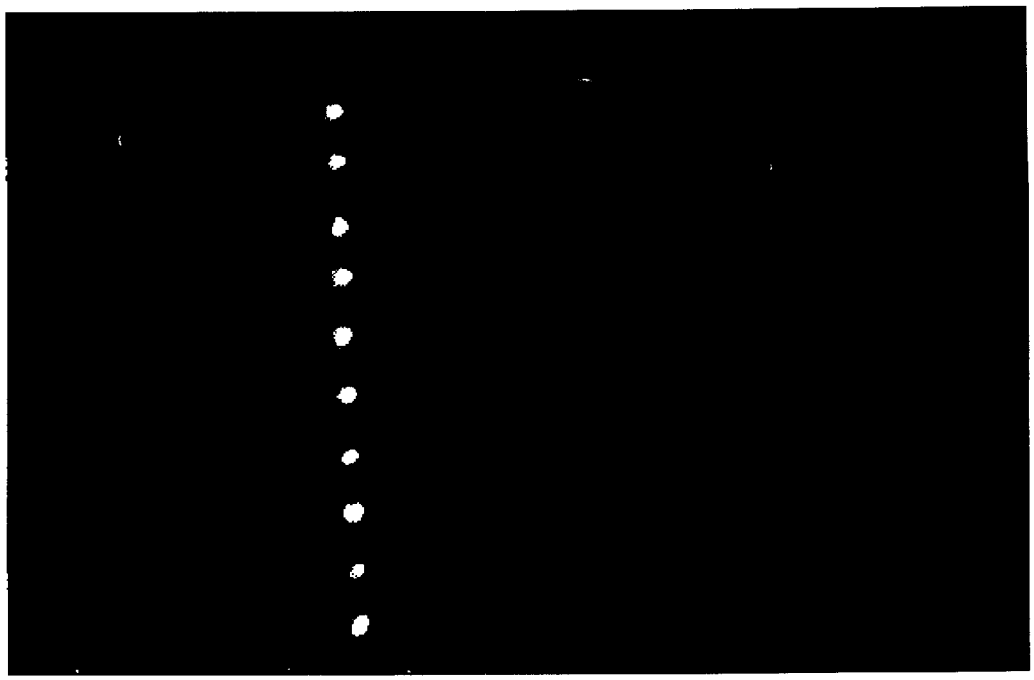
FIG. 7 shows a cross-talk check.
Figure 8A:
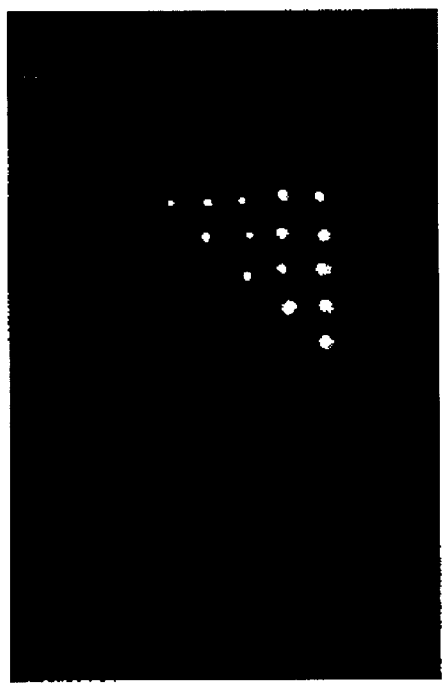
FIGS. 8A–8D illustrate two input images in two different positions: (8A,8B) a triangle; (8C,8D), a circle.
Figure 8B:
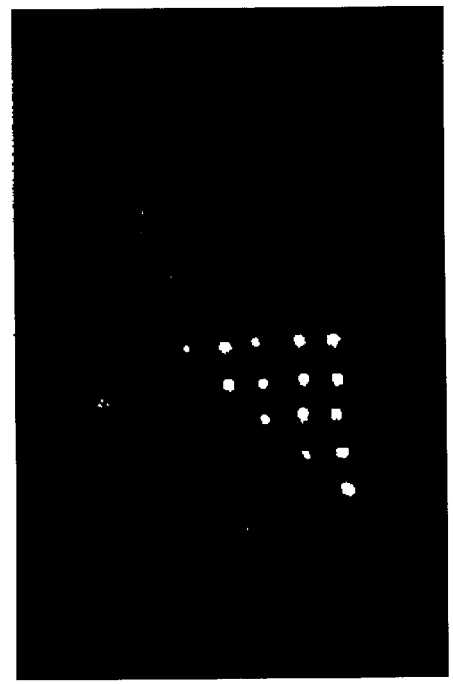
Figure 8C:
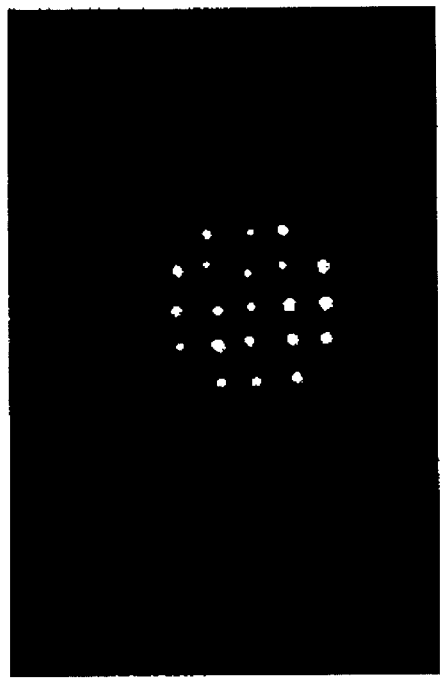
Figure 8D:
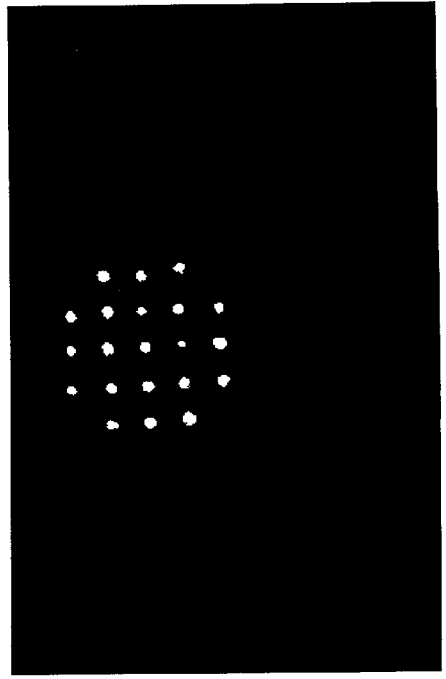
Figure 9A:
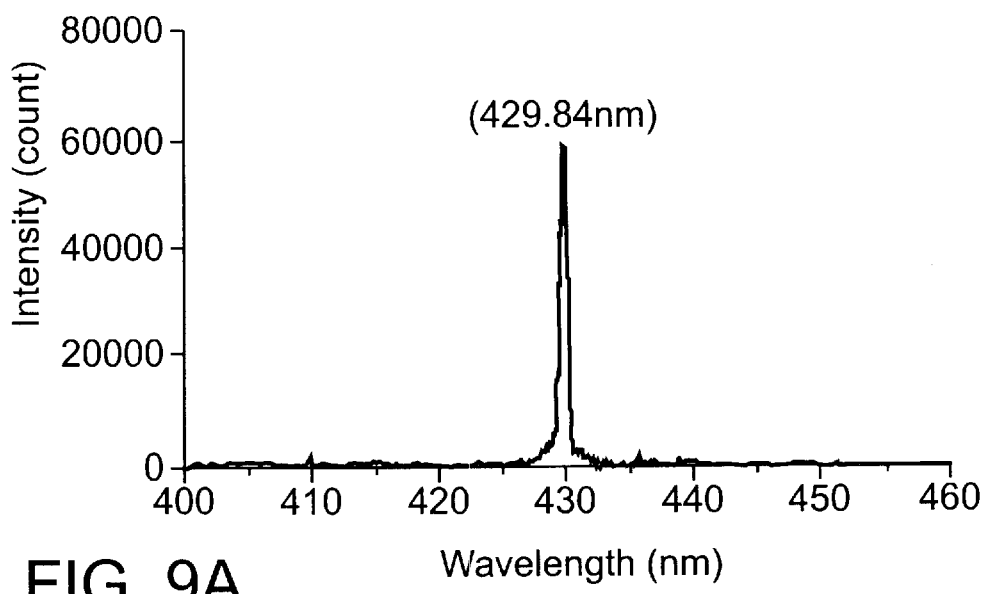
FIGS. 9A, 9B illustrate the wavelength range of the system, with FIG. 9A showing the short-wavelength range and FIG. 9B, the long-wavelength range.
Figure 9B:
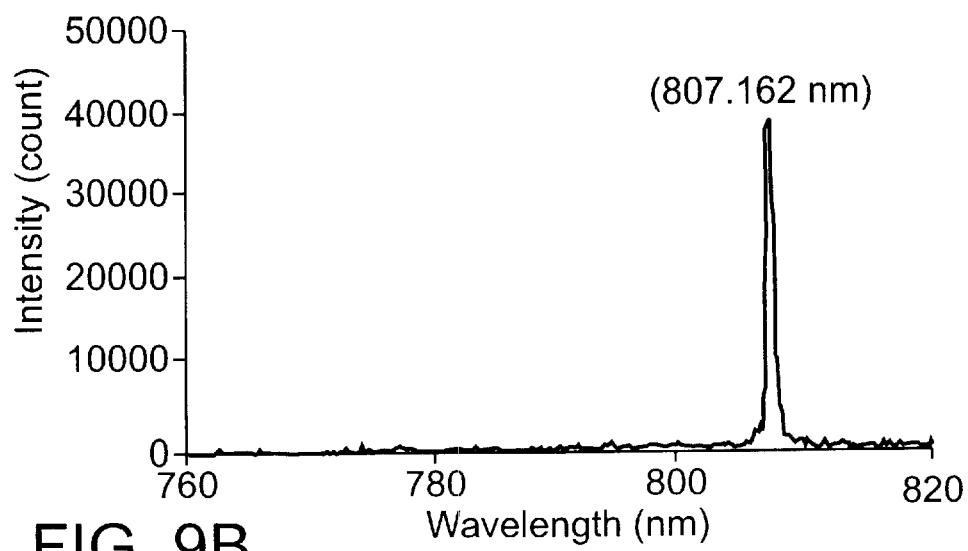

The structure of the fiber array (FIG. 3) places fibers number 1–10 are in order horizontally, as are fibers 11–20, etc. An exemplary check of cross-talk is shown in FIG. 7, with the column 149 of FIG. 3, comprising fibers 2, 12, 22, . . . , 92, illuminated exclusively. It can be seen that no illumination of adjacent columns was detected, which was also the result for all other columns and all rows. This is particularly significant for the close-packed fiber arrays 14, 20 of the present system 10.

Restoration of an input image was checked to ensure that the arrays properly rearrange the pixels following transformation into a one-dimensional array. Two shapes, a triangle and a circle, positioned in two locations, were input, with the results shown in FIGS. 8A–8D. In this test, the fibers were more sparsely arranged, with a 2-mm center-to-center distance, determining a lower resolution of the output image.

The spectral response of the system 10 was also tested using broadband illumination from a xenon arc lamp, emitting in the 50–1500-nm range. The lamp illuminated the input array 14, and an OMA detector was placed at the output array 20, with angle tuning of the grating 180 allowing output frequency selectivity of the two-dimensional image. Two examples at 430 and 807 nm (FIGS. 9A and 9B) show continuous tunability, with the system range limited only by the wavelength the fiber can transmit, here 400–1200 nm.

Figure 10:
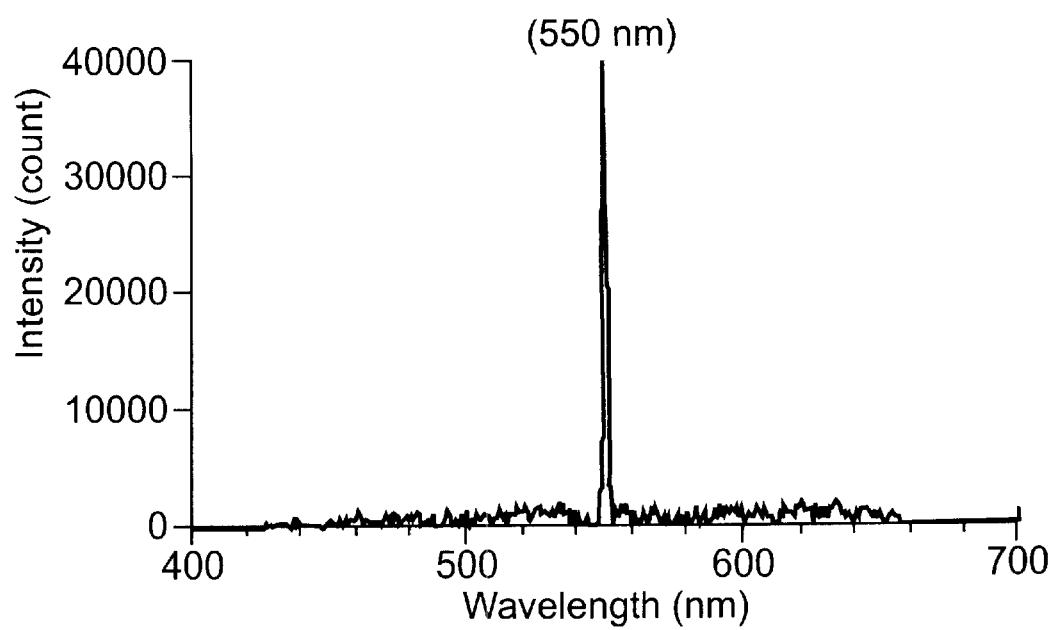
FIG. 10 is a result of a spectral leakage check.

When the system 10 is tuned to a specific wavelength, other wavelengths should be efficiently rejected in the output, and this lack of "spectral leakage" is demonstrated in FIG. 10. Tuning the system 10 to a wavelength in the green region ($\lambda=550$ nm), for example, and scanning from 400 to 700 nm, covering most of the visible spectrum, leads to no evidence of emission at other wavelengths. This was verified at other transmission wavelengths as well.

Figure 11A:
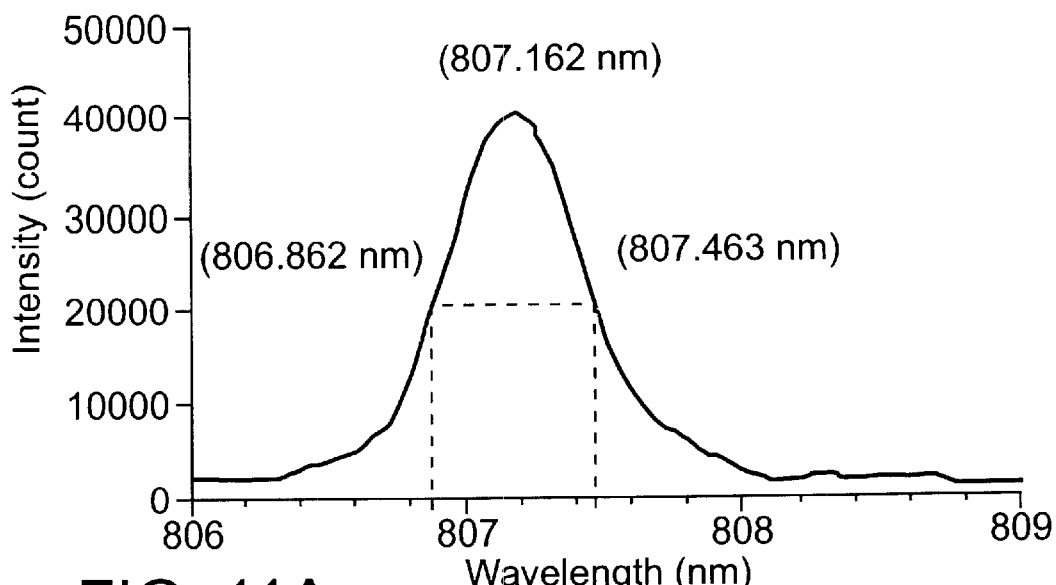
FIGS. 11A, 11B illustrate a bandwidth measurement at (FIG. 11A) the short-wavelength range and (FIG. 11B) the long-wavelength range.
Figure 11B:
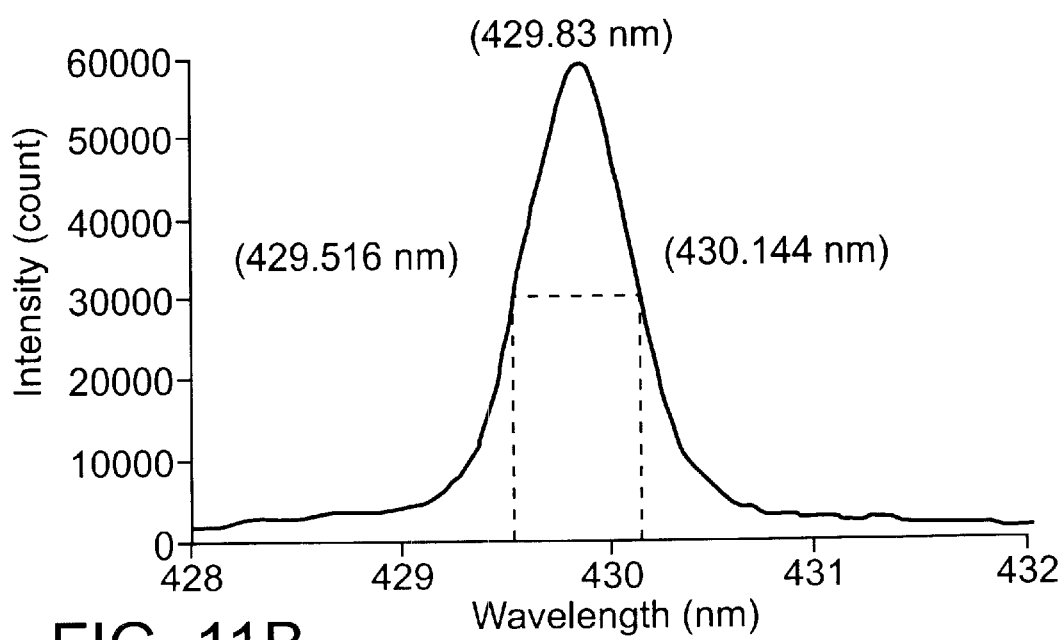
Figure 12A:
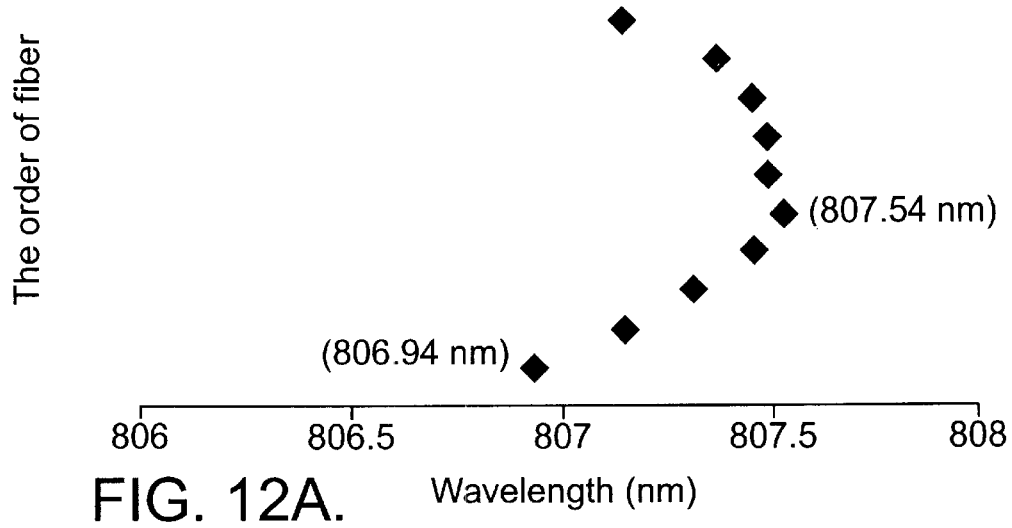
FIGS. 12A, 12B tests for spectrum uniformity at (FIG. 12A) 807.25 nm and (FIG. 12B) 549.5 nm.
Figure 12B:
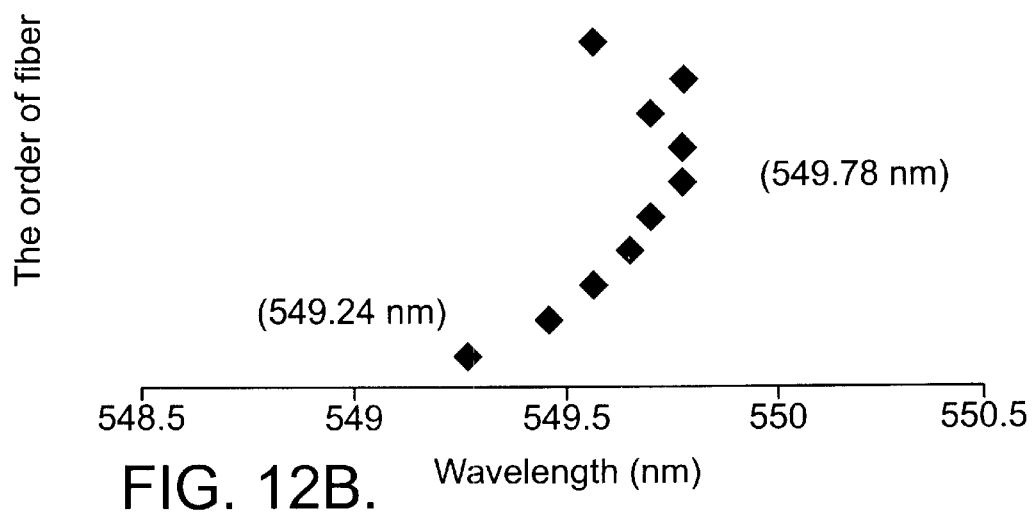

The transmission bandwidth can be obtained by high-resolution measurements of a spectral line detected by the OMA. FIGS. 11A and 11B show the bandwidth of the spectra depicted in FIGS. 9A and 9B, respectively. The bandwidths (FWHM) for both short- and long-wavelength ranges are approximately 0.6 nm, indicating a very uniform bandwidth throughout the tunable range. The theoretical bandwidth, on the basis of the resolution of the diffraction grating and the diameter and position of the fibers used in the one-dimensional output array 20, is calculated to be 0.66 nm, which is consistent with the experimentally observed values. This calculated value for bandwidth is obtained by considering the ratio of the spatial spread of the wavelength range in the plane of the band to the core diameter of the output one-dimensional fiber.

If the position of a fiber in any of the one-dimensional arrays is off slightly relative to other fibers, the wavelength selected will be different from that expected. The OMA was used to test fibers in column 5 for spectral uniformity along the fiber array. By choosing fibers in a column, it is ensured that fibers are sampled that are evenly spaced in the one-dimensional array (see FIG. 3). Further, sampling any entire column affords data over a large range of the one-dimensional array and is thus truly representative of the maximum extent of the spectral nonuniformity. The wavelength of the peak value from each fiber was recorded fiber by fiber and are plotted in FIGS. 12A and 12B, where a curvature is evident. The largest deviations in wavelength throughout the entire range are, respectively, 0.6 and 0.54 nm. This maximum variation is, however, within the 0.6-nm bandwidth discussed previously. Similar results have been obtained for fibers in other columns.

The observed curvature is due to off-axis reflections from the concave mirror. If the system 10 filters a single-frequency light source, such as the output of a He—Ne laser, the images of the first one-dimensional array 14 have a slight spatial curvature introduced by the off-axis fibers. As a result, the second one-dimensional array 20 will pick up slightly disparate wavelengths in a multiwavelength spectrum. Interestingly, from FIGS. 12A and 12B, the positions of the points are not random; rather, they tend to form a smooth curve. This provides a remedy for alleviating this slight problem of spectral nonuniformity. The solution is to match the spatial arrangement of the second one-dimensional array according to the curvature of the imaging mirror, so that all the fibers can image the exact wavelength selected, thereby resulting in better spectral uniformity.

Figure 13A:
FIGS. 13A, 13B show the ability of the system to perform pattern recognition based on spectral signature at (FIG. 13A) 450 nm and (FIG. 13B) 458 nm.
Figure 13B:
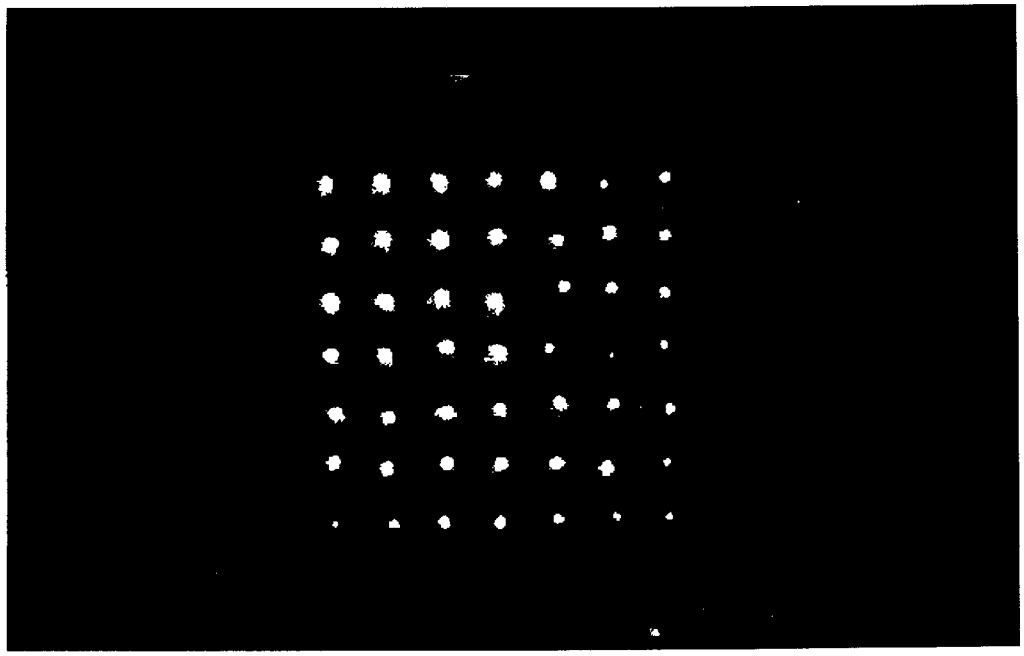

An important function of the filter system 10 is to allow spatial patterns of a selected wavelength to pass through. In order to test this function, two object images were projected onto the input of the system simultaneously. One of these objects was a triangle at a wavelength of 450 nm, while the other was rectangular at a wavelength of 458 nm. The wavelengths were generated by an Ar ion laser (458 nm) and a Xe arc lamp with a commercial filter of 450 nm. By appropriately tuning the angle of the grating 18, only the desired pattern can be selected at the output of the system 10 and recorded by a CCD camera (FIGS. 13A and 13B). There is no observable interference between the images at these two different but closely spaced wavelengths. In both cases the output of the system 10 was identical to the shape and size of the corresponding spectral component in the dual-wavelength input object.

These performance tests confirm the capability of a system as described herein to analyze a two-dimensional multiwavelength object into its spectral constituents, with a potential wavelength resolution on the order of angstroms and micrometer or better spatial resolution. Gated viewing can provide the derivation of constituent monochromatic, two-dimensional images with temporal resolution of dynamic events on the 10-ns time scale. The two-dimensional spectral imager is continuously tunable, and any wavelength that can be transmitted by the optical fibers and dispersed by the monochromator is available for viewing.

Numerous applications exist in the viewing of two-dimensional objects, in which the ability to view different spectral components while maintaining spatial integrity is important. For example, CCD imaging has been used to image laser-ablated plume dynamics by viewing the plume fluorescence [53–56]. The filter of the present invention is particularly suitable for studying plume emission during the laser ablation process for the growth of thin films. It is also possible to provide species-resolved, dynamic information about the spatial expansion and propagation of individual atomic and molecular species in a multicomponent laser-ablated plume. This is believed possible, as the demonstrated resolution and tunability of the spectral imager allows the isolation of emission from any atomic or molecular species and two-dimensional display in real time.

Other applications include, but are not intended to be limited to, plasma diagnostics, combustion diagnostics (such as rocket plume imaging), real-time process monitoring for fluorescent processes, medical imaging (for example, the fluorescent detection of cancer cells), and sensing of spatial temperature variations (via blackbody radiation detection using a suitable fiber material).

It may be appreciated by one skilled in the art that additional embodiments may be contemplated, including different components and materials to achieve the same functionalities described herein.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

References

[1] G. Kopp and M. Derks, "Stay Tuned: Photonic Filters Color Your World," Photon. Spect. 31, 125 (1997).

[2] N. D. Finkelstein, W. R. Lempert and R. B. Miles, "Rotational Raman Scattering Measurements with a Single Mode Laser Source and Narrow Passband Filter," Opt. Lett. 22: (8), 537 (1997).

[3] J. Sabbaghzadeh, W. Buell, J. Holder and M. Fink, "A Very Narrow High Throughput Rayleigh Filter for Raman Spectroscopy," Appl. Phys. B, 60: (2–3), S261, Suppl. S (1995).

[4] Z. Y. Liu, I. Matsui and N. Sugimoto, "High Spectral-Resolution Lidar Using an Iodine Absorption Filter for Atmospheric Measurements," Opt. Eng., 38: (10), 1661 (1999).

[5] A. P. Yalin and R. B. Miles, Opt. Lett., 24: (9), 590 (1999).

[6] P. Golz and P. Andresen, "Atomic vapor filter for two-dimensional Rayleigh imaging experiments with a narrow-band KrF excimer laser," Appl. Opt., 35: (30), 6054 (1996).

[7] M. H. Duan, Y. M. Li, J. X. Tang and Q. J. Wang, "A study of the physical properties of Zeeman absorption Faraday anomalous dispersion optical filter," Acta Physica Sinica—Overseas Edition, 4: (1), 33 (1995).

[8] N. D. Hung, Y. Segawa, Y. H. Meyer, P. Long and L. H. Lai, "A time-compensated spectral filter for transform-limited tunable picosecond pulse generation from spectro-temporal-selection dye lasers," Appl. Phys. B 62: (5), 449 (1996).

[9] A. N. Naumov, R. B. Miles, P. Barker, and A. M. Zheltikov, "Ultradispersive Prisms and Narrow-Band Tunable Filters Combining Dispersion of Atomic Resonances and Photonic Band-Gap Structures," Laser Phys. 10, 622 (2000).

[10] M. Jablonski, Y. Takushima, K. Kikuchi, Y. Tanaka, K. Furuki, K. Sato, and N. Higashi, "Layered Optical Thin-Film Allpass Dispersion Equalizer for Compensation of Dispersion-Slope of Optic Fibers," Elect. Lett. 36, 1139 (2000).

[11] A. Ankiewicz and G. D. Peng, "Narrow Bandpass Filter Using Bragg Grating Coupler in Transmission," Elect. Lett. 33, 2151 (1997).

[12] Y. A. Nestrizhenko, Optika I Spektroscopiya, 65: (1), 210 (1988).
[13] S. Tibuleac, P. P. Young, R. Magnusson, and T. R. Holzheimer, "Experimental Verification of Waveguide-Mode Resonant Transmission Filters," IEEE Micro. Guided Wave Lett. 9, 19 (1999).
[14] A. Safaai-Jazi and C. C. Chang, "Spectral Characteristics of Coupled-Waveguide Fabry-Perot Resonators and Filters," IEEE J. Quant. Elect. 32, 1063 (1996).
[15] A. Inoue, T. Iwashima, T. Enomoto, S. Ishikawa, and H. Kanamori, "Optimization of Fiber Bragg Grating for Dense WDM Transmission System," IEICE Trans. Elect. E81C, 1209 (1998).
[16] C. J. Chung and A. Safaai-Jazi, "Narrow-Band Spectral Filter Made of W-Index and Step-Index Fibers," Jour. Lightwave Technol. 10: (1), 42 (1992).
[17] A. Safaai-Jazi and J. C. Mckeeman, "All-Fiber Spectral Filters With Nonperiodic Bandpass Characteristics and High Extinction Ratios in the Wavelength Range 0.8 $\mu$m<$\lambda$<1.6 $\mu$m," Jour. Lightwave Technol., 9: (8), 959 (1991).
[18] N. S. Gluck and W. J. Gunning, "Patterned infrared spectral filter directly deposited onto cooled substrates," Appl. Opt. 28: (23), 5110 (1989).
[19] J. Jagannathan and A. Safaai-Jazi A, J. Mod. Optic. 44: (3), 581 (1997).
[20] C. H. Lee, S. S. Lee, H. K. Kim and J. H. Han, "Transmission of Directly Modulated 2.5-Gb/s Signals Over 250-km of Nondispersion-Shifted Fiber by Using a Spectral Filtering Method," IEEE Photon. Technol Lett. 8: (12), 1725 (1996).
[21] M. Tschanz, A. Rebane and U. P. Wild, "Waveguide narrowband optical filter using spectral hole burning," Opt. Eng. 34: (7), 1936 (1995).
[22] S. C. Chao and M. S. Wu, Jour. Lightwave Technol. 12: (10), 1777 (1994).
[23] G. Kopp, Proc. of the SPIE, 2873, 324 (1997).
[24] R. Y. Tsai, S. C. Shiau, D. Lin, F. C. Ho, and M. Y. Hua, Appl. Opt. 38, 5452 (1999)
[25] J. H. Kim, Opt. Eng., 37: (11), 3031 (1998).
[26] M. J. Vrhel, H. J. Trussell and J. Bosch, J. Electron Imaging, 4: (1), 6 (1995).
[27] Q. G. Li and H. G. Li, Appl. Opt., 24: (8), 1180 (1985).
[28] A. Jun-Won, K. Jung-Hoi, K. Nam, and L. Kwon-Yee, Tech. Dig. CLEO 4, 819 (1999).
[29] G. A. Rakuljic and V. Leyva, Opt. Lett., 18: (6), 459 (1993).
[30] M. Yoshikawa and K. Kameda, IEICE Trans. On Electronics, E77C: (9), 1526 (1994).
[31] D. E. Battey, J. B. Slater, R. Wludyka, H. Owen, D. M. Pallister and M. D. Morris, Appl. Spectroscopy 47: (11), 1913 (1993).
[32] Z. Q. Wang, C. M. Cartwright, C. Soutar and W. A. Gillespie, Appl. Opt., 32: (5), 715 (1993).
[33] G. A. Rakuljic and V. Leyva, Opt. Lett., 18: (6), 459 (1993).
[34] M. J. Pelletier and R. C. Reeder, Appl. Spectrosc., 45: (5), 765 (1991).
[35] K. A. Christensen, N. L. Bradley, M. D. Morris, and R. V. Morrison, Appl. Spectr. 49, 1120 (1995).
[36] R. S. Weis and T. K. Gaylord, Jour, Opt. Soc. Amer. A, 5: (9), 1565 (1988).
[37] D. M. Rust, Opt. Eng., 33: (10), 3342 (1994).
[38] W. Gunning, J. Pasko and J. Tracy, Proc. Soc. Photo-Opt. Inst., 268, 198 (1981).
[39] M. Y. Liu and S. Y. Chou, Appl. Phys. Lett. 68: (2), 170 (1996).
[40] H. Wright, C. M. Crandall, and P. Miller, Laser Focus World 32, 85 (1996).
[41] Y. A. Nestrizhenko, Optika I Spektroskopiya, 74: (2), 410 (1993).
[42] W. Q. Zhang, Optik, 111: (2), 85 (2000).
[43] T. W. Tukker, C. Otto and J. Greve, J. Opt. Soc. Am. B, 16: (1), 90 (1999).
[44] J. S. Wang, G. X. Ai, G. F. Song, B. Zhang, X. M. Ye, Y. P. Nie, T. Chiveh, W Tsay and H. S. Li, Solar Physics, 161: (2), 229 (1995).
[45] K. Naganuma, G. Lenz and E. P. Ippen, IEEE Jour. Quant. Electr., 28: (10), 2142 (1992).
[46] S. D. Zhu, Appl. Opt., 29: (3), 410 (1990).
[47] J. Staromlynska, S. M. Rees and M. P. Gillyon, Appl. Opt., 37: (6), 1081 (1998).
[48] R. S. Seymour, S. M. Rees, J. Staromlynska, J. Richards and P. Wilson, Opt. Eng., 33: (3), 915 (1994).
[49] A. L. Aleksandrovskii, T. A. Vinogradova, N. P. Depman and V. V. Tarasenko, Soviet Journal of Optical technology, 59: (4), 216 (1992).
[50] E. J. Rhodes, Applications of the magneto-optical filter to stellar pulsation measurements, (National Aeronautics and Space Administration, Washington D.C., 1985).
[51] D. M. Rust, Continued development of an ultra-narrow bandpass filter for solar research, (National Aeronautics and Space Administration, Washington D.C., 1993).
[52] H. A. Macleod, Thin-film optical filter, (Macmillan Publishing Co, New York, 1986).
[53] D. B. Geohegan, Appl. Phys. Lett. 60, 2732 (1992).
[54] D. B. Geohegan, Appl. Phys. Lett. 62, 1463 (1993).
[55] D. B. Geohegan, Mat. Res. Soc. Symp. Proc., 285, 27 (1993).
[56] P. Mukherjee, S. Chen, and S. Witanachchi, Appl. Phys. Lett., 74, 1546 (1999).
[57] P. Mukherjee, S. Chen, and S. Witanachchi, Rev. Sci. Instrum., 72, 2624 (2001).

What is claimed is:

1. An optical filter comprising:
   a plurality of input optical fibers, each input optical fiber having a first end and a second end opposed to the first end, wherein:
   the first ends are substantially two-dimensionally arrayed;
   the second ends are substantially linearly arrayed; and
   each input fiber is configured to receive a portion of a two-dimensional input image at the first end and transmit the image portion to the second end;
   a spectrally dispersive element for receiving the image portions from the input fiber second ends and for outputting separated spectral components thereof; and
   a plurality of output optical fibers, each having a first end and a second end opposed to the first end, wherein:
   the first ends are substantially linearly arrayed;
   the second ends are substantially two-dimensionally arrayed;
   each output fiber is configured to receive a predetermined portion of the spectrally dispersed output at the first end and transmit the image portion to the second end; and
   the second ends are arrayed in corresponding fashion to the first ends of the input fibers for spatially reconstructing the input image.

2. The optical filter recited in claim 1, wherein the plurality of input optical fibers are positioned relative to each other in a predetermined packing arrangement commensurate with a desired resolution.

3. The optical filter recited in claim 2, wherein the positioning of the input optical fibers comprises a close-packed arrangement for maximum resolution.

4. The optical filter recited in claim 2, wherein the positioning of the input optical fibers comprises a loose-packed arrangement for site-specific multipoint imaging.

5. The optical filter recited in claim 1, wherein each input fiber has a diameter selected for achieving a desired resolution.

6. The optical filter recited in claim 1, wherein the spectrally dispersive element comprises a monochromator for dispersing constituent spectral components of the input image.

7. The optical filter recited in claim 6, wherein the monochromator comprises a triple-grating monochromator.

8. The optical filter recited in claim 6, wherein the spectral component output comprises a 1:1 ratio with the input image.

9. The optical filter recited in claim 1, wherein the spectrally dispersive element comprises a grating, and the optical filter further comprises:
   a first concave mirror upstream of the grating for forming a collimated parallel beam from the output of the second ends of the input fibers; and
   a second concave mirror positioned for collecting diffraction from the grating and for forming an image of the output of the second ends of the input fibers at a focal plane.

10. The optical filter recited in claim 9, further comprising a stage for mounting the grating thereon, the stage comprising means for adjustment in a vertical direction, in a horizontal direction, and rotationally about a vertical axis.

11. The optical filter recited in claim 9, wherein the second concave mirror is positioned for collecting a first order of diffraction from the grating.

12. The optical filter recited in claim 1, wherein the input fibers and the output fibers are substantially identical.

13. The optical filter recited in claim 12, wherein each input fiber and each optical fiber comprises a silica fiber and a cladding surrounding the silica fiber.

14. The optical filter recited in claim 12, wherein each fiber has a transmission range spanning the visible and infrared region of the optical spectrum.

15. The optical filter recited in claim 1, wherein the spectrally dispersive element is continuously tunable.

16. The optical filter recited in claim 1, wherein the first end of the output fibers is continuously translatable to select a predetermined spectral component of a dispersed image.

17. A system for optically filtering an input image comprising:
   a plurality of input optical fibers, each input optical fiber having a first end and a second end opposed to the first end, wherein:
      the first ends are substantially two-dimensionally arrayed;
      the second ends are substantially linearly arrayed; and
      each input fiber is configured to receive a portion of a two-dimensional input image at the first end and transmit the image portion to the second end;
   a spectrally dispersive element for receiving the image portions from the input fiber second ends and for outputting separated spectral components thereof;
   a plurality of output optical fibers, each having a first end and a second end opposed to the first end, wherein:
      the first ends are substantially linearly arrayed;
      the second ends are substantially two-dimensionally arrayed;
      each output fiber is configured to receive a predetermined portion of the spectrally dispersed output at the first end and transmit the image portion to the second end; and
      the second ends are arrayed in corresponding fashion to the first ends of the input fibers for spatially reconstructing the input image into a final image; and
   means for detecting the final image.

18. The system recited in claim 17, further comprising an optical element for altering a size of the input image upstream of the input fiber bundle.

19. The system recited in claim 18, wherein the optical element is selected from a group consisting of a magnification element and a reduction element.

20. The system recited in claim 17, wherein the detecting means comprises a camera.

21. The system recited in claim 20, wherein the camera comprises a charge-coupled-device camera.

22. The system recited in claim 20, wherein the camera comprises a fast, time-gated camera.

23. The system recited in claim 20, wherein the camera comprises a time-integrating camera.

24. The system recited in claim 17, further comprising means for displaying the final image.

25. The system recited in claim 24, wherein the display means comprises a video monitor.

26. The system recited in claim 17, wherein the spectrally dispersive element comprises a monochromator for dispersing constituent spectral components of the input image.

27. The system recited in claim 17, wherein the spectrally dispersive element comprises a grating, and further comprising:
   a first concave mirror upstream of the grating for forming a collimated parallel beam from the output of the second ends of the input fibers; and
   a second concave mirror positioned for collecting diffraction from the grating and for forming an image of the output of the second ends of the input fibers at a focal plane.

28. The system recited in claim 27, further comprising a stage for mounting the grating thereon, the stage comprising means for adjustment in a vertical direction, in a horizontal direction, and rotationally about a vertical axis.

29. The system recited in claim 17, wherein each of the input fibers and the output fibers has a transmission range spanning the visible and infrared region of the optical spectrum.

30. The system recited in claim 17, wherein the spectrally dispersive element is continuously tunable.

31. The system recited in claim 17, wherein the first end of the output fibers is continuously translatable to select a predetermined spectral component of a dispersed image.

32. A method for filtering a two-dimensional optical image comprising the steps of:
   directing a two-dimensional input image onto first ends of a plurality of input optical fibers, the input fiber first ends substantially two-dimensionally arrayed;
   spectrally dispersing image portions from second ends of the input fibers, the input fiber second ends opposed to the first ends and substantially linearly arrayed; and
   directing a predetermined portion of the spectrally dispersed image portions onto first ends of a plurality of output optical fibers, the output fiber first ends substantially linearly arrayed, the output fibers each having a second end opposed to the first end, the second ends substantially two-dimensionally arrayed in corresponding fashion to the first ends of the input fibers for spatially reconstructing the input image.

33. The method recited in claim 32, wherein the spectrally dispersing step comprises using a monochromator to disperse constituent spectral components of the input image.

34. The method recited in claim 32, wherein the spectrally dispersing step comprises using a grating, and further comprising the steps of:
   forming a collimated parallel beam from the output of the second ends of the input fibers; and
   collecting diffraction from the grating and forming an image of the output of the second ends of the input fibers at a focal plane.

35. The method recited in claim 34, further comprising mounting the grating on a stage for adjusting a position of the grating in a vertical direction, in a horizontal direction, and rotationally about a vertical axis.

36. The method recited in claim 32, wherein the spectrally dispersing step comprises providing means for continuously tuning the image portions from the input fiber second ends.

37. The method recited in claim 32, wherein the directing step comprises providing means for continuously translating the output fiber first ends to select a predetermined spectral component of the spectrally dispersed image.

38. A method for optically filtering and detecting an input image comprising the steps of:
   directing a two-dimensional input image onto first ends of a plurality of input optical fibers, the input fiber first ends substantially two-dimensionally arrayed;
   spectrally dispersing image portions from second ends of the input fibers, the input fiber second ends opposed to the first ends and substantially linearly arrayed; and
   directing predetermined portions of the spectrally dispersed image portions onto first ends of a plurality of output optical fibers, the output fiber first ends substantially linearly arrayed, the output fibers each having a second end opposed to the first end, the second ends substantially two-dimensionally arrayed in corresponding fashion to the first ends of the input fibers for spatially reconstructing the input image; and
   detecting the final image.

39. The method recited in claim 38, further comprising altering a size of the input image upstream of the input fiber bundle.

40. The method recited in claim 39, wherein the altering step comprises one of the steps of magnifying and reducing the input image.

41. The method recited in claim 38, wherein the detecting step comprises using a camera.

42. The method recited in claim 41, wherein the camera comprises a charge-coupled-device camera.

43. The method recited in claim 38, wherein the detecting step comprises time-gating the input image.

44. The method recited in claim 38, wherein the detecting step comprises time-integrating the input image.

45. The method recited in claim 38, further comprising displaying the final image.

46. The method recited in claim 38, wherein the spectrally dispersing step comprises dispersing constituent spectral components of the input image using a monochromator.

47. The method recited in claim 38, wherein the spectrally dispersing step comprises using a grating, and further comprising the steps of:
   forming a collimated parallel beam from the output of the second ends of the input fibers; and
   collecting diffraction from the grating and forming an image of the output of the second ends of the input fibers at a focal plane.

48. The method recited in claim 47, further comprising mounting the grating on a stage for adjusting a position of the grating in a vertical direction, in a horizontal direction, and rotationally about a vertical axis.

49. The method recited in claim 38, wherein the spectrally dispersing step comprises providing means for continuously tuning the image portions from the input fiber second ends.

50. The method recited in claim 38, wherein the directing step comprises providing means for continuously translating the output fiber first ends to select a predetermined spectral component of the spectrally dispersed image.

51. The method recited in claim 38, wherein each of the input fibers and the output fibers has a transmission range spanning the visible and infrared region of the optical spectrum.

* * * * *